United States Patent
Krausz et al.

(10) Patent No.: US 7,654,586 B2
(45) Date of Patent: Feb. 2, 2010

(54) PIPE SEAL ELEMENT

(75) Inventors: Eliezer Krausz, Tel-Aviv (IL); Avi Chiproot, Kfar-Saba (IL)

(73) Assignee: Krausz Industries Development Ltd., Tel-Aviv (IL)

( * ) Notice: Subject to any disclaimer, the term of this patent is extended or adjusted under 35 U.S.C. 154(b) by 0 days.

(21) Appl. No.: 11/229,542

(22) Filed: Sep. 20, 2005

(65) Prior Publication Data

US 2006/0061090 A1    Mar. 23, 2006

(30) Foreign Application Priority Data

Sep. 21, 2004   (IL) ..................................... 164194

(51) Int. Cl.
*F16L 21/02*  (2006.01)
(52) U.S. Cl. ................. 285/369; 285/337; 285/111
(58) Field of Classification Search ................. 285/424, 285/111, 112, 369, 337
See application file for complete search history.

(56) References Cited

U.S. PATENT DOCUMENTS

| 1,936,552 | A | * | 11/1933 | Goss | ........................... 285/354 |
| 3,207,184 | A | | 9/1965 | Lambert | |
| 3,298,698 | A | * | 1/1967 | Condon | ...................... 277/616 |
| 3,630,533 | A | * | 12/1971 | Butler et al. | ................. 277/577 |
| 3,791,681 | A | * | 2/1974 | Moldow | ..................... 285/233 |
| 4,395,060 | A | | 7/1983 | Lapham | |
| 4,909,519 | A | | 3/1990 | Anderson | |
| 5,052,723 | A | * | 10/1991 | Bartholomew | .............. 285/108 |
| 5,232,252 | A | * | 8/1993 | Bartholomew | .............. 285/108 |
| 5,280,969 | A | | 1/1994 | Straub | |
| 5,501,472 | A | | 3/1996 | Brancher | |
| 5,772,218 | A | | 6/1998 | Burgess | |
| 5,941,576 | A | * | 8/1999 | Krausz | ....................... 285/110 |
| 6,109,665 | A | * | 8/2000 | Meinig | ....................... 285/405 |
| 6,152,494 | A | | 11/2000 | Corbett, Sr. | |
| 6,293,556 | B1 | * | 9/2001 | Krausz | ....................... 277/549 |

FOREIGN PATENT DOCUMENTS

| DE | 89 05 558 U1 | 6/1990 |
| EP | 0 463 424 A | 1/1992 |
| FR | 1 421 443 A | 12/1965 |
| FR | 2 337 849 A | 8/1977 |

OTHER PUBLICATIONS

EP 05 10 8698 Search Report Jan. 9, 2008 Berlin.

* cited by examiner

*Primary Examiner*—David E Bochna
(74) *Attorney, Agent, or Firm*—Pearl Cohen Zedek Latzer, LLP

(57) ABSTRACT

An improved static seal element, sometimes referred to as a gasket, which maintains contact with a pipe and a flange during and after seal compression, such seal being particularly useful in a removable pipe coupling. The improved elastomer static seal element is for the prevention of leakage from between two pipes to be connected end to end, a flange being provided to contact the element, and being at least partially contained in a sheet metal housing which is arranged to apply diametric pressure to seal the element against the outer surface of one of the pipes and against the flange, the improvement being the addition of a stabilizer and seal lip projecting beyond the outer diameter of the seal element to maintain the seal in position against the metal housing vis-à-vis the flange of the center component.

4 Claims, 2 Drawing Sheets

PIPE SEAL ELEMENT

CROSS REFERENCE TO RELATED APPLICATIONS

This application claims the benefit of IL application Serial No. 164194, filed Sep. 21, 2004, which is incorporated in its entirety herein by reference.

FIELD OF INVENTION

The present invention relates to the sealing of round section bodies, such as the external surface of a pipe.

More particularly, the invention provides an improved static seal element, sometimes referred to as a gasket, which maintains contact with a pipe and a flange during and after seal compression, such seal being particularly useful in a removable pipe coupling.

BACKGROUND OF THE INVENTION

While dynamic seal design has been given much attention, the simpler matter of designing a good static seal is still not finalized. Static seals, as opposed to dynamic seals, can be pressed hard against the surface to be sealed. Such pressure is often used to retain two pipe ends in a pipe coupling and thus to provide a mechanical leak-proof joint. The coupling, and the flexible seal element used therein, and the sheet-metal housing containing the seal and applying pressure thereto, was disclosed in my previous U.S. Pat. No. 6,293,556, which is hereby incorporated in the present specification.

The seal element described in my previous patent is a ring having a cross-section which in approximate or simplified terms can be represented by a square. As is known, shape distortion occurs when a flexible element is compressed between a pair of rigid parallel surfaces. On compression such seal element will take the form of a squat barrel having a flat upper and lower faces and an outwardly curved sidewall, as will be seen in FIG. 1. The curved sidewall however does not seal well against a flat flange, allowing some leakage of high pressure fluids of low-viscosity. The resulting leakage path leads from the flange of the coupling, around the edge of the U-channel and onto the outer face of the U channel itself.

In U.S. Pat. No. 4,909,519 Anderson discloses a pressure-resistant system for joining concrete pipes end to end. The seal is retained by internal ribs extending into the cement.

Brancher, in U.S. Pat. No. 5,501,472 discloses a compression seal for conduits passing through watertight barriers, such as containment sumps for underground gasoline storage. The seal is much exposed to the stored liquid and is likely to fail under pressure.

The gland seal assembly disclosed by Burgess in U.S. Pat. No. 5,772,218 features axial compression means to achieve radial compression of the packing rings. The rings are square sectioned. As this is a dynamic seal, little pressure is applied to the revolvable shaft and the minor seal geometry distortion which results is used for shaft sealing.

In U.S. Pat. No. 6,152,494 Corbett Sr., et al. describe and claim a pipe gasket with combined lip and compression seal geometry. The seal is not subjected to high pressure, as it is inserted into a groove within a socket end of a thermoplastic pipe and the projections provided are intended for sealing against the outer diameter of the pipe.

OBJECTS OF THE INVENTION

It is therefore one of the objects of the present invention to obviate the disadvantages of prior art seals and to provide a seal element which effectively seals an outer surface of a pipe and stabilizes the seal within the housing vis-à-vis the body of the housings.

It is a further object of the present invention to provide an improved seal for use in a pipe coupling of the type seen in U.S. Pat. No. 6,293,556.

SUMMARY OF THE INVENTION

The present invention achieves the above objects by providing an improved elastomer static seal element for the prevention of leakage from between two pipes to be connected end to end, a flange being provided to contact said element, said element being at least partially contained in a sheet metal housing which is arranged to apply diametric pressure to seal said element against the outer surface of one of said pipes and against said flange, the improvement being the addition of a stabilizer and seal lip projecting beyond the outer diameter of said seal element to maintain the seal in position against said metal housing vis-à-vis said flange of the center component.

In a preferred embodiment of the present invention there is provided a seal element wherein said flange is a part of a pipe coupling.

In a most preferred embodiment of the present invention there is provided a seal assembly including a seal element and a sheet metal housing at least partly containing said seal element and provided with clamp means for exerting peripheral pressure on said seal element.

Yet further embodiments of the invention will be described hereinafter.

In contradistinction to Corbett, the present invention describes a high-pressure seal ring seal element for the prevention of leakage from between two pipes to be connected end to end. One or both pipes are provided with a flange. The seal ring can be substantially compressed yet due to a small extension it maintains sealing pressure against said flange during compression and during the resulting distortion of said seal element.

It will thus be realized that in practice the novel seal of the present invention serves, at least three purposes:

a) stabilizing the seal and maintain its position;

b) high pressure sealing against the pipe;

c) mechanical force retention of the pipe; and d) sealing two parts of the coupling itself.

In order to explain the last item reference is again made to our previous U.S. Pat. No. 6,293,556. The sheet-metal coupling is seen composed of three components: two end clamp members and a central U-shaped ring. The central U member retains its original position, while the two end clamp members are tightened onto the seal elements. As therefore the two end clamp members must move inwards towards the pipe center the clamp members must be at least partially separate from the central U member and the seal held therein moves and changes position, and due to metal-to-metal contact between arms of the central section and the clamp housing, leakage between the clamp member and the central members is possible. The present invention provides the seal which corrects these defects.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

DETAILED DESCRIPTION OF EMBODIMENTS OF THE INVENTION

Figure 1:
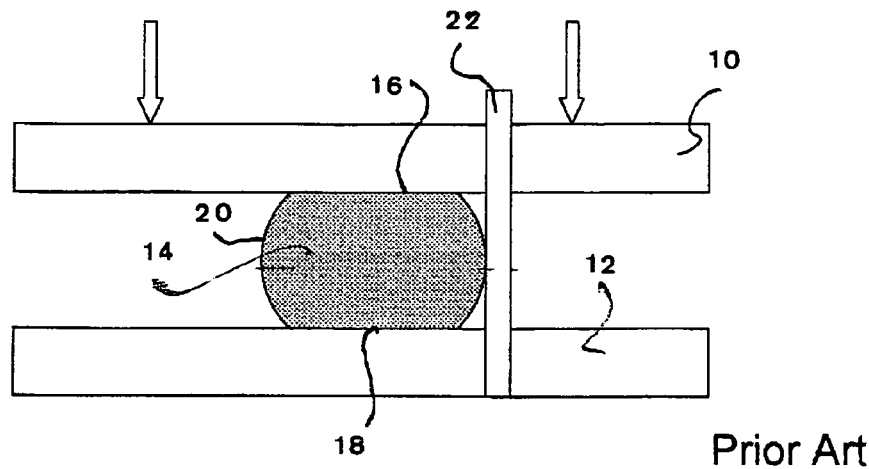
FIG. 1 is an elevational view showing diagrammatically the distortion of a prior art seal when in use and under compression.

FIG. 1 depicts diagrammatically the distortion occurring when a square-section seal ring is compressed between a pair of rigid parallel surfaces 10, 12. On compression such seal element 14 will take the form of a squat barrel having a flat upper 16 and flat lower face 18 and an outwardly curved sidewall 20. The curved sidewall 20 however does not seal well against a flat flange 22, allowing some leakage of high pressure fluids of low-viscosity. The resulting leakage path be seen more clearly in FIG. 2.

Figure 2:
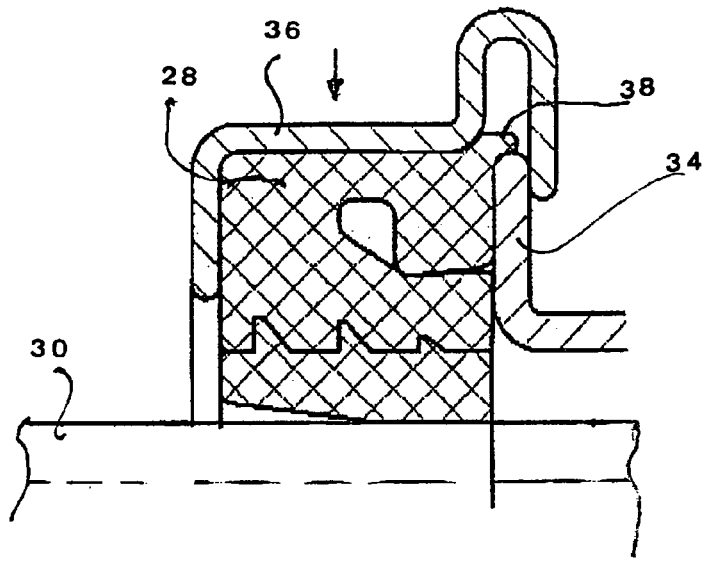
FIG. 2 is a cross-sectional detail view of a preferred embodiment of the seal element according to the present invention.

There is seen in FIG. 2 an improved elastomer static seal element 28 for the prevention of leakage from between two pipes 30, 32, the pipe 30 being seen and the pipe 32 being seen in the following figure. The pipes 30, 32 which may have different outside diameters, are to be connected end to end. A flange 34 is provided in contact with the seal element 28, the element being at least partially contained in a sheet metal housing 36 which is arranged to apply peripheral, and thus diametric pressure to seal the element 28 against the outer surface of one of the pipes 30 and against the flange 34.

A stabilizer seal lip 38 projects beyond the outer diameter of the seal element 28 to maintain its position against the flange 34 at any time and during diametric compression and during the resulting distortion of the seal element, and to seal a gap between the housing 36 and the flange 34.

The details of the seal element 28 construction are not relevant to the present specification, the seal element being fully described in my earlier U.S. Pat. No. 6,293,556.

The preferred elastomer for the seal element is a rubber, the grade chosen being compatible with the fluid expected to be pumped through pipe 30 when in use.

With reference to the rest of the figures, similar reference numerals have been used to identify similar parts.

Figure 3:
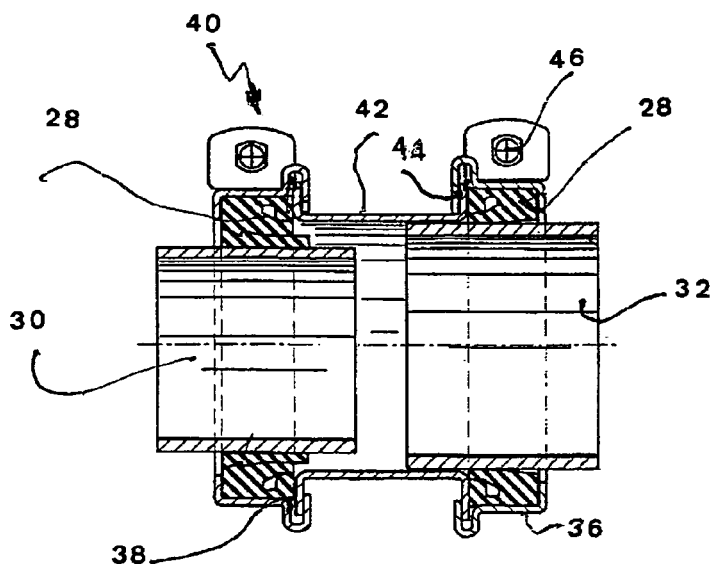
FIG. 3 is a cross-sectional view of a pipe coupling using the seal element of the present invention.

Referring now to FIG. 3 there are seen two seal elements 28 which are part of a pipe coupling 40 connecting pipes 30 and 32 end to end. The pipes 30, 32 are not provided with flanges. However the U-section center component 42 does have flanges 44, seen to better effect in 34 of FIG. 2. Each seal element 28 is enclosed in a housing 36 connected to the center component 42. Clamping means are seen at 46.

Figure 4:
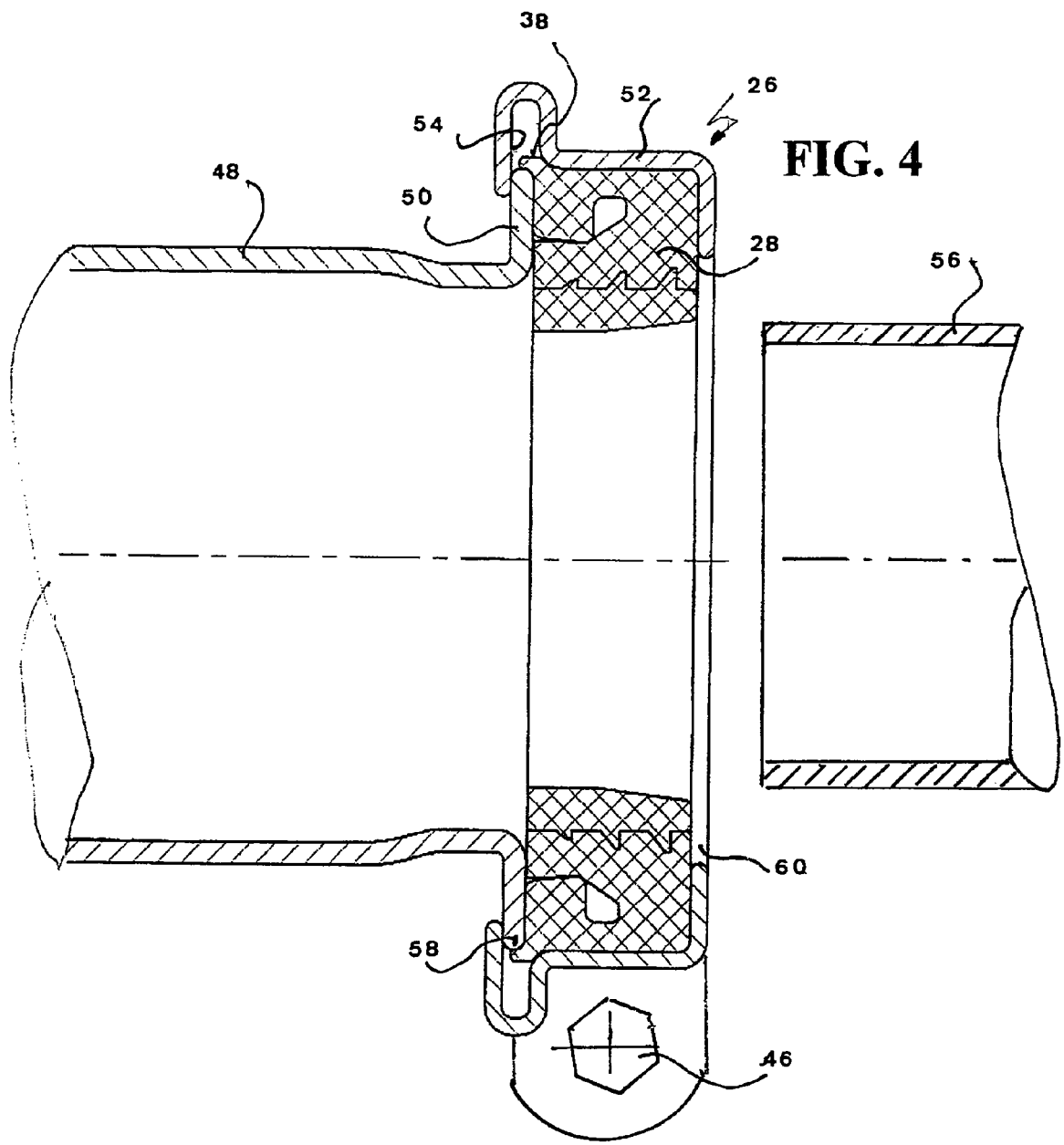
FIG. 4 is a cross-sectional view of a simplified pipe coupling for pipes of different diameters using the seal element.

Turning now to FIG. 4 there is seen a seal assembly 26 for a pipe 48 provided with a flange 50. The sheet metal housing 52 is provided with a surface 54 arranged to contact the rear face of the flange 50.

A second pipe 56, of smaller diameter than the pipe 48 may be inserted through the seal element 28, which may be clamped to retain both pipes 48, 56. In this, as in previous embodiments the stabilizer seal lip 38 maintains its position against the flange 50 also during diametric compression and during the resulting distortion of the seal element.

In a further embodiment not shown the large central aperture 60 seen in the housing 52 is not present, allowing removable closure of the pipe 48.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

We claim:

1. A seal assembly for the prevention of leakage from between two pipes to be connected end to end, the seal assembly comprising:
   an elastomer seal element;
   a sheet metal housing at least partly containing said seal element and arranged to apply diametric pressure to seal said elastomer seal element against an outer surface of one of said pipes and against a flange having a first face to contact said seal element, said sheet metal housing having a curved edge, the curved edge having a surface contacting a second face of said flange, and wherein a curve of said curved edge creates a void; and
   a seal lip projecting into said void and beyond the outer diameter of said seal element wherein said seal lip contacts both said sheet metal housing and said flange, at all times, to stabilize said seal element and maintain its position prior to and during diametric compression and to seal a gap between said sheet metal housing and said flange.

2. The seal element as claimed in claim 1, wherein said flange is a part of a pipe coupling.

3. The seal element as claimed in claim 1, wherein said elastomer is a rubber.

4. The seal element as claimed in claim 1, wherein said sheet metal housing is provided with clamp means for exerting peripheral pressure on said seal element.

\* \* \* \* \*